(12) United States Patent
Arora et al.

(10) Patent No.: US 12,507,147 B2
(45) Date of Patent: Dec. 23, 2025

(54) MANAGING UPDATE EVENTS FOR DATA PROCESSING SYSTEMS USING OUT OF BAND COMMUNICATION CHANNELS

(71) Applicant: Dell Products L.P., Round Rock, TX (US)

(72) Inventors: Mohit Arora, Frisco, TX (US); Abeye Teshome, Austin, TX (US); Gokul Thiruchengode Vajravel, Bangalore (IN); Vinodkumar Vasudev Ottar, Mckinney, TX (US); Richard M. Tonry, Mckinney, TX (US); Bassem El-Azzami, Austin, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 18/498,270

(22) Filed: Oct. 31, 2023

(65) Prior Publication Data

US 2025/0142444 A1     May 1, 2025

(51) Int. Cl.
*H04W 40/02*     (2009.01)
*H04W 28/02*     (2009.01)

(52) U.S. Cl.
CPC ....... *H04W 40/02* (2013.01); *H04W 28/0247* (2013.01)

(58) Field of Classification Search
CPC .......................... H04W 28/0247; H04W 40/02
See application file for complete search history.

(56) References Cited

U.S. PATENT DOCUMENTS 7,200,105 B1 *   4/2007   Milliken ............. H04L 63/1416
                                                                                                                                    370/216
7,599,907 B2    10/2009   Havewala et al.
(Continued)

OTHER PUBLICATIONS

Qayyum et al., "Awareness of Kill Switch Application Among Mobile Phone Users" 2019 UK/ China Emerging Technologies (UCET), Glasgow, UK, 2019, pp. 1-5, doi:10.1109/UCET.2019.8881876 ( 5 pages).

(Continued)

*Primary Examiner* — Syed Ali
(74) *Attorney, Agent, or Firm* — WOMBLE BOND DICKINSON (US) LLP

(57) ABSTRACT

Methods and systems for managing update events for data processing systems are disclosed. An update event may indicate that an update configuration is available for a data processing system. A management controller for the data processing system may utilize an out of band communication channel to obtain the update configuration for the data processing system without hardware components of the data processing system being powered. The update configuration may indicate a combination of hardware and/or software components for an application hosted by the data processing system. The update configuration may be assigned by an administrator and may be implemented by an update agent for the data processing system upon powering the hardware resources of the data processing system.

20 Claims, 5 Drawing Sheets

(56) References Cited

U.S. PATENT DOCUMENTS

| | | |
|---|---|---|
| 8,020,192 B2 | 9/2011 | Wright et al. |
| 8,490,163 B1 | 7/2013 | Harsell et al. |
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |
| 9,392,021 B1 | 7/2016 | Labana |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,225,158 B1 | 3/2019 | Lu |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 10,887,276 B1 | 1/2021 | Parulkar |
| 11,563,565 B2 | 1/2023 | Yang et al. |
| 11,704,384 B2 | 7/2023 | Murphy et al. |
| 2007/0112962 A1* | 5/2007 | Lewontin .............. H04L 69/14 709/227 |
| 2007/0113266 A1 | 5/2007 | Ross |
| 2009/0086731 A1* | 4/2009 | Lee ..................... H04H 60/73 370/389 |
| 2009/0300717 A1* | 12/2009 | Mandava ............. G06F 21/57 710/15 |
| 2010/0019730 A1 | 1/2010 | Chueh |
| 2010/0191837 A1 | 7/2010 | Linden |
| 2012/0032834 A1 | 2/2012 | Weeks |
| 2012/0046025 A1 | 2/2012 | Das |
| 2012/0151223 A1 | 6/2012 | Conde Marques |
| 2012/0166605 A1 | 6/2012 | Chou |
| 2012/0202447 A1 | 8/2012 | Edge |
| 2013/0086262 A1 | 4/2013 | Bhadri |
| 2013/0210464 A1 | 8/2013 | Mittal |
| 2013/0219171 A1* | 8/2013 | Gearhart ............ H04L 63/0485 713/153 |
| 2013/0246199 A1* | 9/2013 | Carlson ............... G06Q 20/405 705/16 |
| 2013/0347089 A1* | 12/2013 | Bailey .................... H04L 63/18 726/7 |
| 2014/0082754 A1 | 3/2014 | Guo |
| 2014/0181844 A1* | 6/2014 | Von Bokern .......... G06F 9/4411 719/321 |
| 2014/0181891 A1* | 6/2014 | Von Bokern .......... H04L 63/102 726/1 |
| 2014/0181892 A1* | 6/2014 | Von Bokern .......... H04L 9/0877 726/1 |
| 2014/0208132 A1* | 7/2014 | Cheston ................. H04L 12/12 713/310 |
| 2015/0121506 A1 | 4/2015 | Cavanaugh |
| 2016/0378169 A1 | 12/2016 | Naeimi |
| 2017/0277876 A1 | 9/2017 | Alameh et al. |
| 2017/0289197 A1 | 10/2017 | Mandyam et al. |
| 2017/0364712 A1 | 12/2017 | Munafo |
| 2018/0006829 A1 | 1/2018 | Kravitz et al. |
| 2018/0191733 A1 | 7/2018 | Kundu |
| 2018/0253569 A1 | 9/2018 | Swierk |
| 2019/0095352 A1 | 3/2019 | Poornachandran |
| 2019/0156019 A1 | 5/2019 | Chen |
| 2019/0173962 A1 | 6/2019 | Ben Ali |
| 2020/0092332 A1 | 3/2020 | Bhattathiri |
| 2020/0137688 A1 | 4/2020 | Gulbay |
| 2021/0168093 A1 | 6/2021 | Andrews |
| 2022/0222328 A1 | 7/2022 | Talib et al. |
| 2023/0124661 A1 | 4/2023 | Liu |
| 2023/0297701 A1 | 9/2023 | Mouallem |
| 2023/0403555 A1 | 12/2023 | Farooq |
| 2024/0421916 A1 | 12/2024 | Myron |

OTHER PUBLICATIONS

Tu et al., "Understanding User's Behaviors in Coping with Security Threat of Mobile Devices Loss and Theft", 2012 45th Hawaii International Conference on System Sciences, Maui, HI, USA, 2012, pp. 1393-1402, doi: 10.1109/HICSS.2012.620 (10 pages).

Pfitzmann et al., "Trusting Mobile User Devices and Security Modules", in Computer, vol. 30, No. 2, pp. 61-68, Feb. 1997, doi: 10.1109/2.566159 (8 pages).

Ju et al., "Implementation of a Hardware Security Chip for Mobile Devices", in IEEE Transaction on Consumer Electronics, vol. 61, No. 4, pp. 500-506, Nov. 2015, doi: 10.1109/TCE.2015.7389805 (7 pages).

* cited by examiner

MANAGING UPDATE EVENTS FOR DATA PROCESSING SYSTEMS USING OUT OF BAND COMMUNICATION CHANNELS

FIELD

Embodiments disclosed herein relate generally to managing data processing systems. More particularly, embodiments disclosed herein relate to systems and methods to manage updates to hardware and/or software configurations for the data processing systems using at least an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
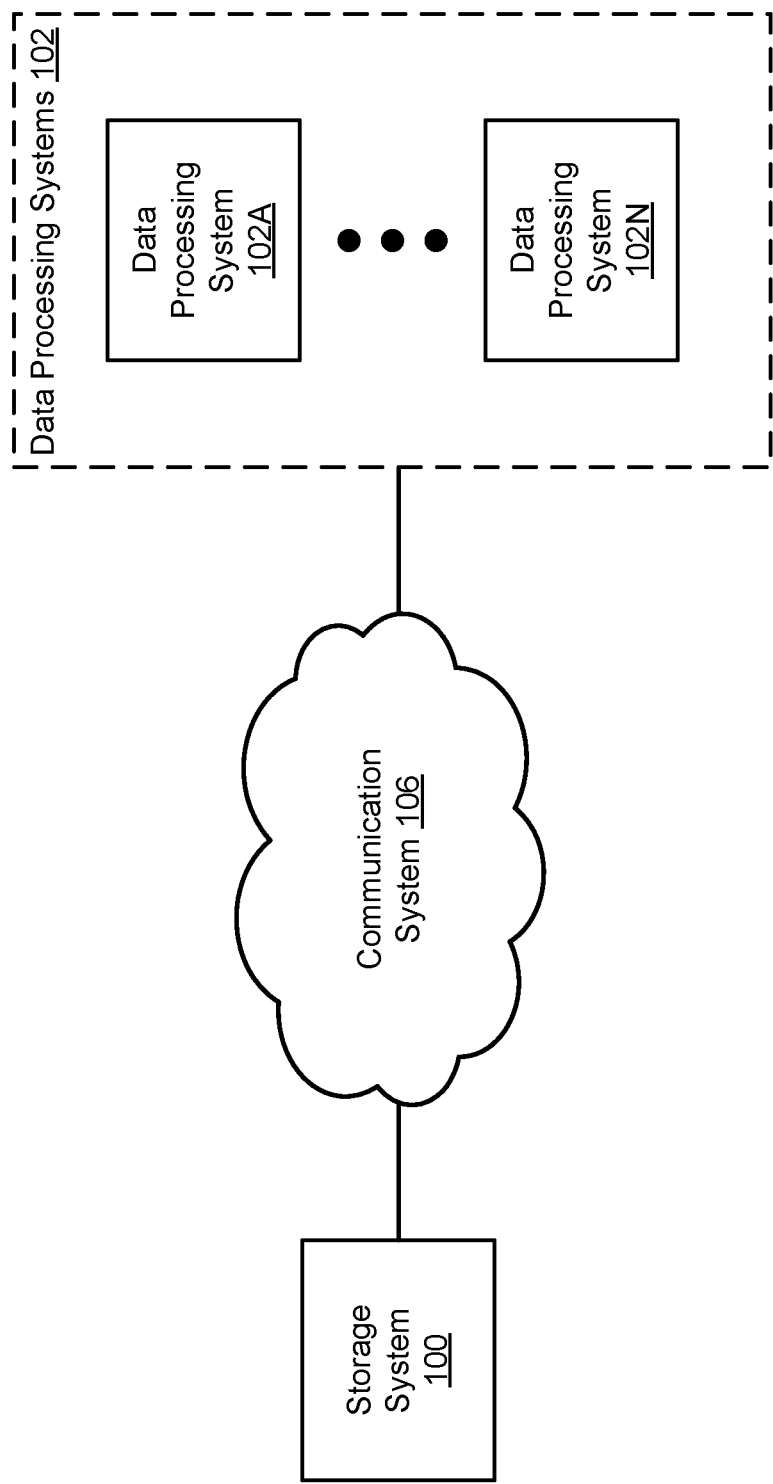
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services. The computer-implemented services may include any quantity and type of such services.

To provide the computer-implemented services, the data processing systems may need to operate in a predetermined manner conducive to, for example, execution of applications hosted by the data processing systems that provide the computer-implemented services. The applications may utilize certain configurations of hardware resources and/or software resources to provide the desired computer-implemented services.

Different data processing systems may perform different computer-implemented services based on, for example, different operating locations for the data processing systems, use of different applications hosted by the data processing systems, etc. The computer-implemented services provided by a data processing system of the data processing systems may also change over time due to, for example, software updates for the data processing system.

A configuration of hardware resources and/or software resources for the data processing system may need to be obtained due to occurrence of an update event for the data processing system. The update event may occur due to: (i) the data processing system being deployed to a new location with new regional data usage regulations, (ii) the data processing system being updated to host one or more new applications, (iii) the data processing system requiring re-installation of an operating system, thereby deleting an existing configuration of the hardware and/or software resources, and/or (iv) other occurrences.

Identifying and obtaining the configuration of hardware resources and/or software resources may interrupt and/or delay provision of the computer-implemented services (e.g., due to time required to obtain and/or apply the new configuration), may lead to an undesirable increase in network bandwidth consumption (e.g., due to the increased network traffic during the update event), and/or may otherwise decrease the availability of the computer-implemented services for downstream consumers of the computer-implemented services.

To reduce the downtime of the computer-implemented services and the network bandwidth consumption associated with update events for the data processing systems, embodiments disclosed herein relate to methods and systems for obtaining configurations of hardware resources and/or software resources for data processing systems using a management controller and an out of band communication channel. The management controller and a network module that manages communication channels for the data processing system may be powered separately from hardware resources of the data processing system. Therefore, the management controller may obtain the configuration while the hardware resources of the data processing system are unpowered.

Specifically, the management controller may identify that an update configuration is available for the data processing system and may obtain the update configuration without requiring power to be provided to the hardware resources and without utilizing any other communication channels (e.g., an in band communication channel) of the data processing system. Consequently, when the hardware resources are powered, the configuration may be available for implementation thereby reducing downtime associated with preparing to provide the computer-implemented services.

In an embodiment, a method of managing data processing systems is provided. The method may include: making, by a management controller of a data processing system of the data processing systems, an identification that an update event for the data processing system has occurred; providing, by the management controller and in response to the identification, an identifier for the data processing system to a storage system via an out of band communication channel; obtaining, by the management controller and via the out of band communication channel, an update configuration for the data processing system based on the provided identifier; and providing, by the management controller and via a side band communication channel, the update configuration to an agent hosted by hardware resources of the data processing system to initiate implementation of the update configuration for the data processing system.

The data processing system may include a network module adapted to separately advertise network endpoints for the management controller and the hardware resources, the network endpoints being usable by the storage system to address communications to the hardware resources and the management controller.

The management controller and the network module may be on separate power domains from the hardware resources so that the management controller and the network module may be operable while the hardware resources are inoperable.

The update event may occur while the hardware resources are inoperable due to being unpowered.

The update configuration may be obtained while the hardware resources are inoperable due to being unpowered.

The out of band communication channel may run through the network module, and an in band communication channel that services the hardware resources also may run through the network module.

The management controller may host a transmission control protocol/internet protocol (TCP/IP) stack to facilitate network communications via the out of band communication channel.

The update configuration may specify a configuration for an application hosted by the hardware resources.

The update configuration for the data processing system may be implemented by modifying a user applied configuration for the application to match the configuration.

The update event may be receipt of a notification from the storage system that an administrator has assigned the update configuration for implementation by the data processing system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
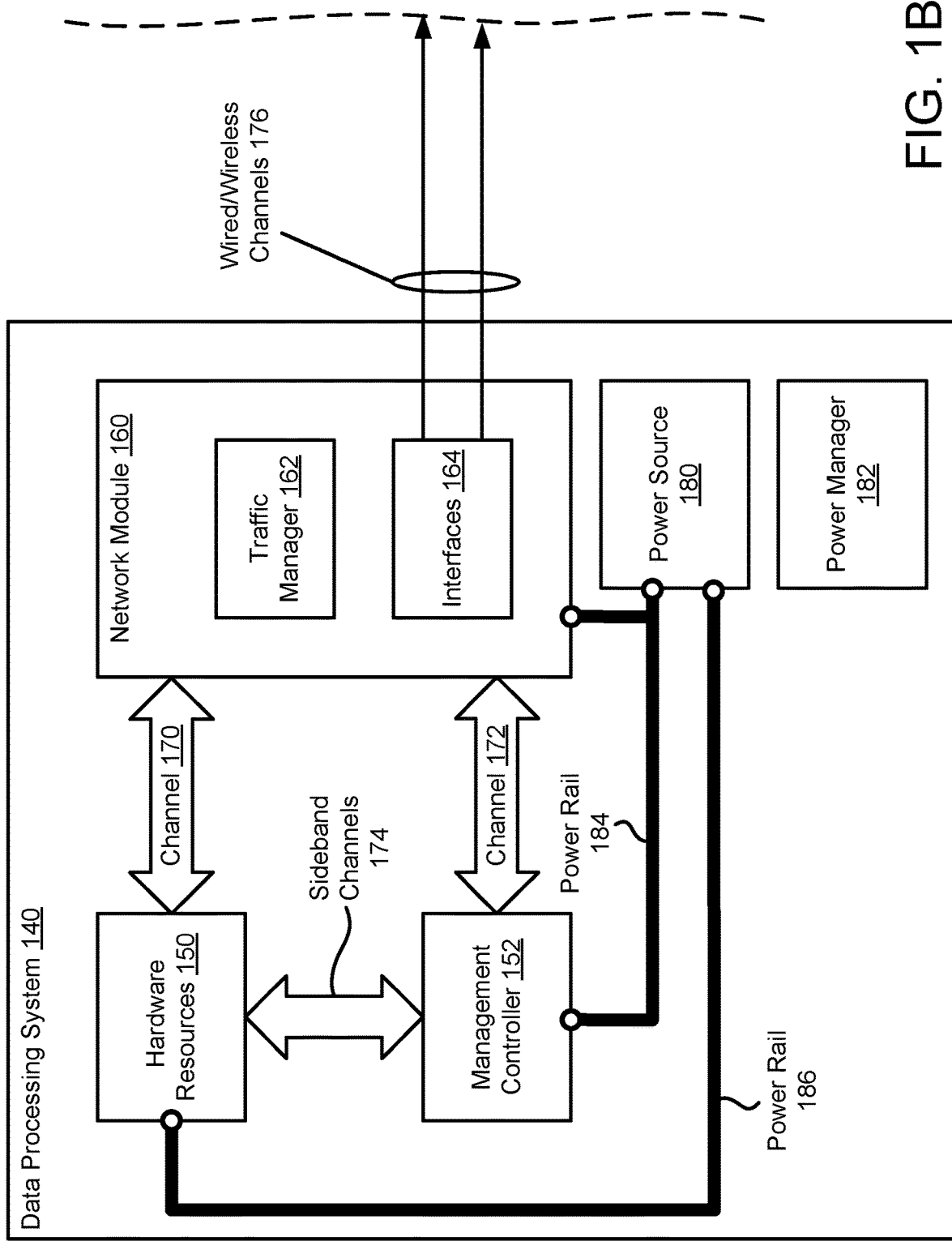
FIG. 1B shows a block diagram illustrating a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in the hardware and/or software components may provide for various types of different computer-implemented services to be provided over time. Refer to FIG. 1B for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, storage system 100, data processing systems 102 and/or any other type of devices (not shown in FIG. 1A). Other types of computer-implemented services may be provided by the system shown in FIG. 1A without departing from embodiments disclosed herein.

To provide the aforementioned computer-implemented services, any of data processing systems 102 (e.g., 102A, 102N) may need to operate in a predetermined manner. For example, certain hardware components and/or software components may need to be operational for data processing systems 102 to provide a desired type and/or quantity of computer-implemented services. Different configurations of the hardware components and/or software components may be implemented by data processing systems 102 depending on the type and/or quantity of computer-implemented services desired to be provided by the respective data processing systems 102.

For example, a first data processing system may be deployed to a first location for use by a first user to perform a first type of the computer-implemented services. A first configuration of available hardware resources and/or software resources of the first data processing system may be utilized by the first user due to location-specific regulations, language preferences, application settings, etc.

A second data processing system may have access to a substantially similar quantity and type of hardware and/or software resources as the first data processing system. However, the second data processing system may be deployed to a second location for use by a second user to perform a second type of the computer-implemented services. To perform the second type of the computer-implemented services in the second location, the second user may utilize a second configuration of the available hardware and/or software resources.

The first configuration may need to be obtained prior to operation of one or more applications by a user of the first data processing system to provide the first type of the computer-implemented services. However, obtaining configurations of the hardware and/or software resources for a data processing system may consume network bandwidth, delay provision of computer-implemented services by the data processing system, and/or otherwise negatively impact an experience for the user.

Specifically, when a configuration is identified for a data processing system, an agent hosted by the hardware resources of the data processing system may request and obtain the configuration. The process of requesting and obtaining the configuration may increase downtime of the data processing system and/or may increase network bandwidth consumption due to increased network traffic in order to obtain the configuration.

In general, embodiments disclosed herein relate to systems, devices, and methods for managing data processing systems in a manner that may reduce downtime of data processing systems and network bandwidth consumption during update events (e.g., events triggering the data processing system to obtain configurations) thereby increasing availability of computer-implemented services provided by the data processing systems.

Prior to powering the hardware components of the data processing system, a management controller of the data processing system may utilize a separate power domain and an out of band communication channel to obtain the configuration from storage system 100. Therefore, upon powering the hardware components of the data processing system, the configuration may be available and may be applied thereby decreasing downtime of the data processing system.

Storage system 100 may be implemented using physical devices that provide data storage services (e.g., storing data and providing copies of previously stored data). The devices that provide data storage services may include hardware devices and/or logical devices. For example, storage system 100 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage system 100 may include a memory device (e.g., a dual in line memory device) in which data is stored and from which copies of previously stored data are provided. In another example, storage system 100 may include a persistent storage device (e.g., a solid-state disk drive) in which data is stored and from which copies of previously stored data is provided. In a still further example, storage system 100 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage system 100 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and storage system 100).

Communication system 106 may include the out of band communication channel, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

An update event may occur for data processing system 140 that triggers management controller 152 to obtain an update configuration (e.g., an identified configuration of hardware resources 150 and/or software resources usable to operate an application hosted by data processing system 140). Management controller 152 may obtain the update configuration and may provide the update configuration to an agent of hardware resources 150 for implementation.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To provide its functionality, management controller 152 may: (i) make an identification that an update event for the data processing system has occurred, (ii) provide an identifier for the data processing system to a storage system via an out of band communication channel (e.g., channel 172), (iii) obtain an update configuration for the data processing system based on the provided identifier via the out of band communication channel, (iv) provide the update configuration to an agent hosted by hardware resources of the data processing system via a side band communication channel (e.g., sideband channels 174) to initiate implementation of the update configuration for the data processing system, and/or (v) perform other actions.

Figure 2:
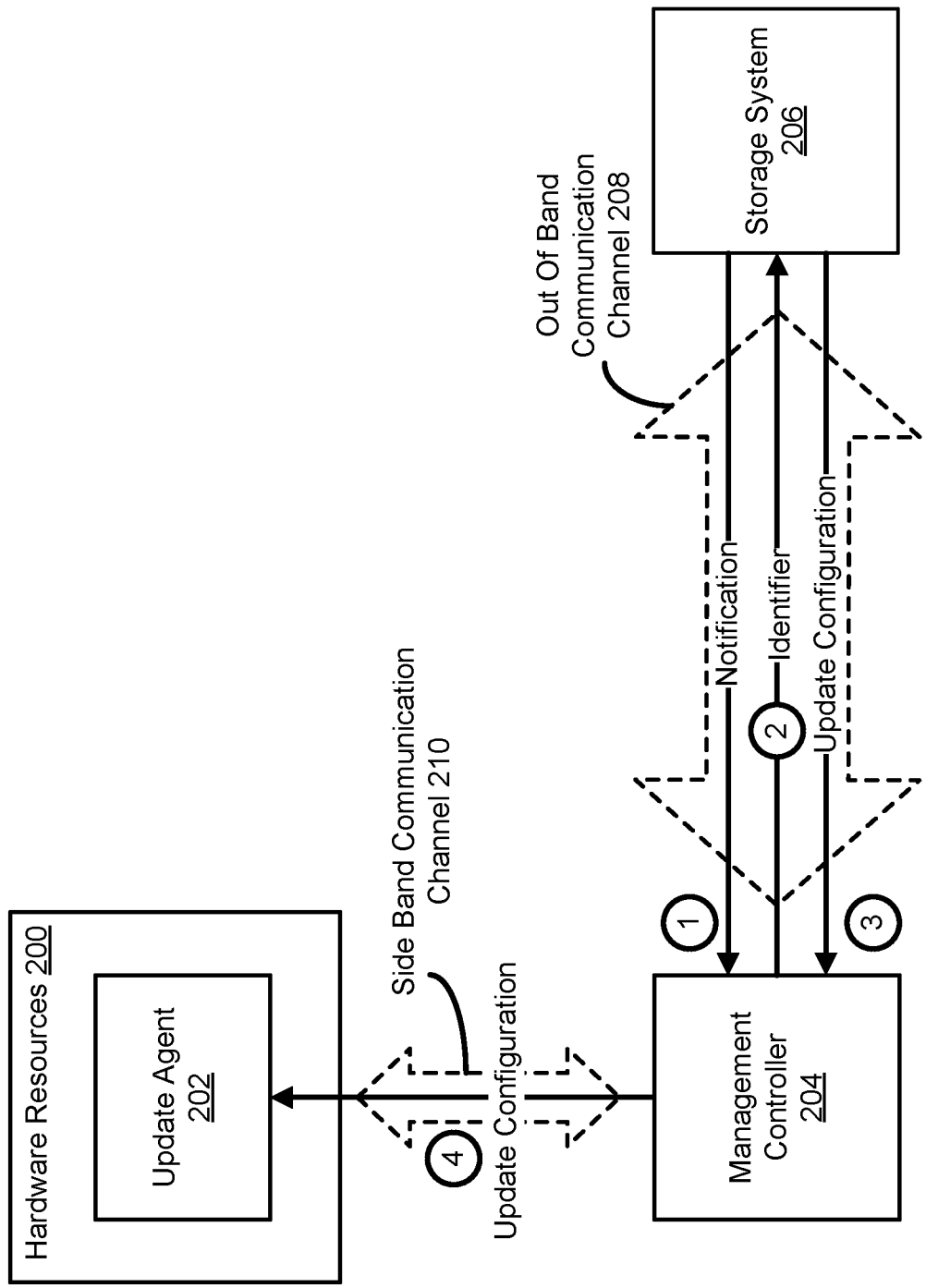
FIG. 2 shows a data flow diagram illustrating a management controller interacting with a storage system and hardware resources in accordance with an embodiment.
Figure 3:
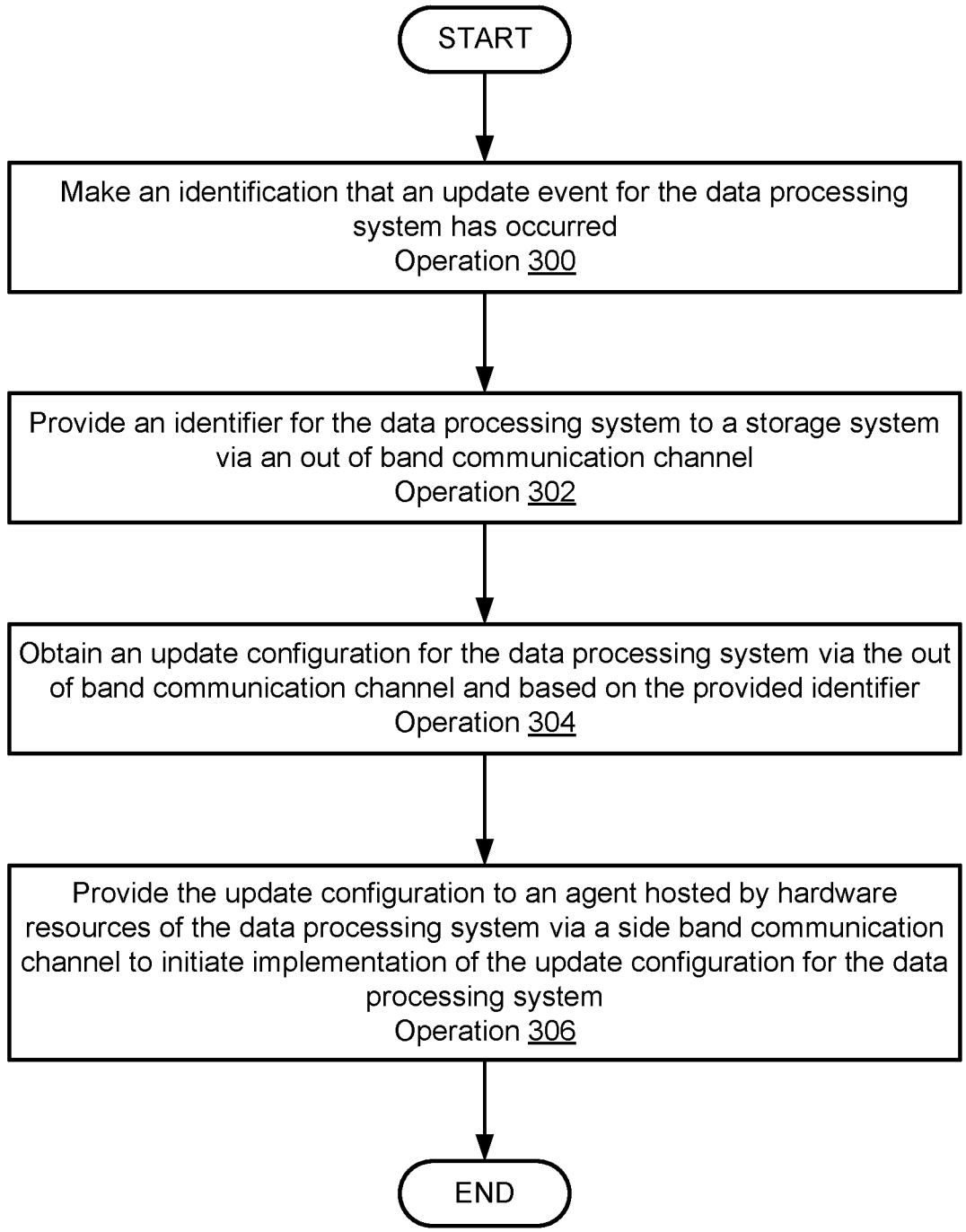
FIG. 3 shows a flow diagram illustrating a method of managing an update event for a data processing system in accordance with an embodiment.

When providing its functionality, management controller 152 may perform all, or a portion, of the methods and operations illustrated in FIGS. 2-3.

While illustrated in FIG. 1B with a limited number of specific components, a system may include additional, fewer, and/or different components without departing from embodiments disclosed herein.

As discussed above, the components of FIGS. 1A-1B may perform various methods to manage update events for data processing systems that perform computer-implemented services. FIGS. 2-3 may illustrate examples of methods that may be performed by the components of FIGS. 1A-1B. For example, a management controller may perform all or a portion of the methods. In the diagrams discussed below and shown in FIGS. 2-3, any of the operations may be repeated, performed in different orders, and/or performed in parallel with or in a partially overlapping in time manner with other operations.

FIG. 2 shows a data flow diagram illustrating a management controller interacting with a storage system and hardware resources in accordance with an embodiment. The data flow diagram may illustrate implementation of an update configuration for a data processing system similar to data processing system 140 described in FIG. 1B. In FIG. 2, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

At time point one (1), storage system 206 may provide a notification to management controller 204 via out of band communication channel 208. Storage system 206 may be similar to storage system 100 described in FIG. 1A and management controller 204 may be similar to management controller 152 described in FIG. 1B.

Receipt of the notification by management controller 204 may constitute an update event for a data processing system associated with management controller 204. The notification may include an indication that an administrator has assigned an update configuration for implementation by the data processing system. The update configuration may specify a configuration for an application hosted by hardware resources 200.

The update configuration may be assigned by the administrator for any reason including, for example: (i) in response to a deployment of the data processing system to a new location, (ii) in response to a new application being intended to be hosted by the data processing system, (iii) in response to a re-installation of an operating system for the data processing system and, therefore, a loss of an existing configuration, and/or (iv) for other reasons.

The administrator may be any entity responsible for assigning update configurations of hardware and/or software resources for any number of data processing systems. The update configuration may be: (i) a new configuration, (ii) an existing configuration, (iii) a historical configuration, and/or (iv) any other type of configuration of hardware and/or software resources that are available to the data processing system.

For example, a service event may occur for the data processing system and an operating system hosted by the data processing system may require re-installation. The process of re-installing the operating system may cause an existing configuration of hardware and/or software resources used by the data processing system to be lost.

However, storage system 206 may maintain a copy of the existing configuration and upon identifying that the service event has occurred, storage system 206 may notify management controller 204 that the existing configuration is available. The notification may also include instructions for management controller 204 to provide identifying information in order for storage system 206 to provide the existing configuration to management controller 204.

At time point two (2), management controller 204 may provide an identifier to storage system 206 via out of band communication channel 208. The identifier may include information usable to confirm the identity of the data processing system by storage system 206. The identifier may also be used to identify an update configuration associated with the data processing system. For example, the identifier may include an internet protocol (IP) address for the data processing system, a media access control (MAC) address corresponding to a network endpoint usable by out of band communication channel 208 to provide communications to management controller 204, a location of the data processing system and/or other information.

At time point one (3), storage system 206 may provide an update configuration to management controller 204 via out of band communication channel 208. The update configuration may specify a configuration for an application hosted by hardware resources 200. The configuration for the application may include, for example, whether an input-output memory management unit is enabled or disabled for the application.

Storage system 206 may store any number of update configurations for any number of data processing systems.

Upon receipt of the identifier, storage system 206 may identify a corresponding update configuration based on the identifier and may provide the update configuration to the network endpoint specified by the identifier via out of band communication channel 208.

Continuing with the above example, storage system 206 may obtain the identifier and may provide the existing configuration for the data processing system to management controller 204 in response to the identifier. The existing configuration may be the configuration of hardware and/or software resources previously implemented by the data processing system prior to re-installation of the operating system.

The operations described at time points one, two, and three may be performed using out of band communication channel 208 as previously mentioned. Management controller 204 and a network module (not shown and described in FIG. 1B) may be powered by a separate power domain from hardware resources 200 and, therefore, the operations shown at time points one, two, and three may be performed while hardware resources 200 are unpowered.

Doing so may allow for receipt of the update configuration prior to powering hardware components 200. As a user of the data processing system may power on hardware components 200 upon first use (e.g., after re-installing an operating system, after first obtaining the data processing system), the first use experience for the user may be improved due to the availability of the update configuration for implementation.

At time point four (4), management controller 204 may provide the update configuration to update agent 202 hosted by hardware resources 200 via side band communication channel 210. Hardware components 200 may be similar to any of hardware resources 150 described in FIG. 1B. Update agent 202 may include software with instructions to receive the update configuration and oversee implementation of the update configuration for hardware components 200. Specifically, update agent 202 may modify hardware resources 200 so that the hardware components of hardware resources 200 indicated by the updated configuration are enabled and other hardware components are disabled. In addition, any number of settings for software intended to be operated by the hardware components indicated in the update configuration may be prepared for use by hardware resources 200.

For example, a user may have made modifications to the configuration of hardware and/or software resources utilized by an application hosted by the data processing system. The user applied configuration may not match a configuration assigned by an administrator and, therefore, implementing the update configuration may include modifying the user applied configuration for the application to match the configuration assigned by the administrator.

The operation described at time point four may occur when hardware resources 200 are powered, as side band communication channel 210 may be inoperable when hardware resources 200 are unpowered. Refer to FIG. 1B for additional details regarding power domains and communication channels for the data processing system.

In an embodiment, the one or more entities performing the operations shown in FIG. 2 are implemented using a processor adapted to execute computing code stored on a persistent storage that when executed by the processor performs the functionality of the system of FIGS. 1A-1B discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1A may perform various methods to manage data processing systems. FIG. 3 illustrates methods that may be performed by the components of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing an update event for a data processing system in accordance with an embodiment is shown. The method may be performed, for example, by a management controller, and/or any other entity.

At operation 300, an identification may be made that an update event for a data processing system has occurred. Making the identification may include: (i) receiving a notification from a storage system and/or other entity indicating that an update configuration has been assigned by an administrator for the data processing system, (ii) reading a notification of the update event from storage, (iii) generating the notification of the update event based on a separate communication from an administrator, and/or (iv) other methods.

At operation 302, an identifier for the data processing system may be provided to a storage system via an out of band communication channel. Providing the identifier may include: (i) encapsulating the identifier in a message and transmitting the message from a first network endpoint usable by the out of band communication channel to a second network endpoint for the storage system, (ii) providing instructions to another entity responsible for transmitting the identifier to the storage system via the out of band communication channel, and/or (iii) other methods.

At operation 304, an update configuration for the data processing system may be obtained via the out of band communication channel and based on the provided identifier. Obtaining the update configuration may include: (i) receiving a message in the form of a transmission at the first network endpoint usable by the out of band communication channel and identifying a payload encapsulated in the message, the payload including the update configuration for the data processing system, (ii) receiving the update configuration from another entity responsible for operating a network module for the out of band communication channel, (iii) reading the update configuration from storage, the update configuration being previously received via the out of band communication channel, and/or (iv) other methods.

At operation 306, the update configuration may be provided to an agent hosted by hardware resources of the data processing system via a side band communication channel to initiate implementation of the update configuration for the data processing system. Providing the update configuration to the agent may include: (i) providing instructions to the agent via the side band communication channel, the instructions including the update configuration and/or instructions for implementation of the update configuration (e.g., a timestamp for the implementation), (ii) transmitting the update configuration to another entity responsible for providing the update configuration to the agent via the side band communication channel, and/or (iii) other methods.

The method may end following operation 306.

Figure 4:
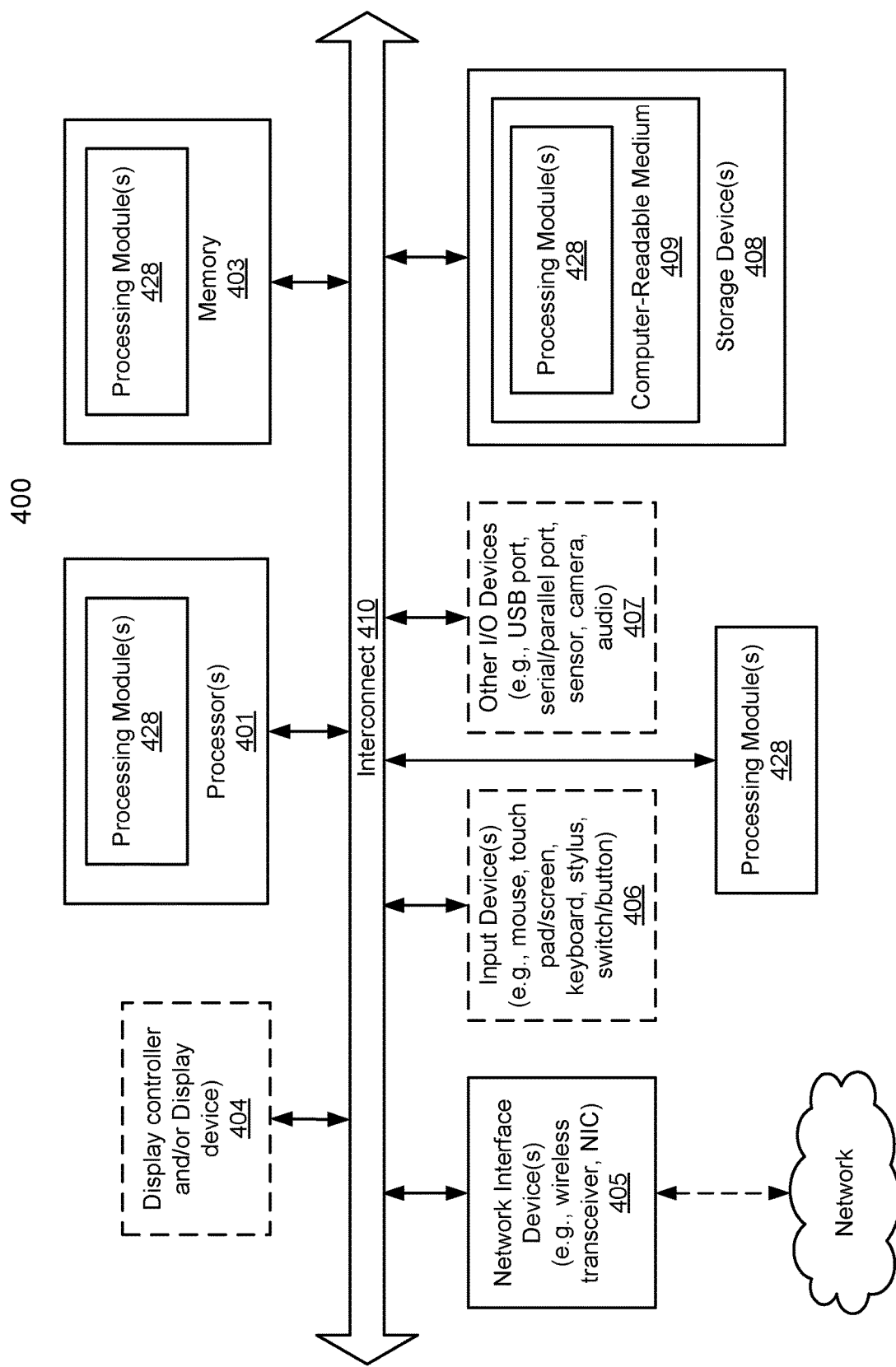
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
    making, by a management controller of a data processing system of the data processing systems, an identification that an update event for the data processing system has occurred;
    providing, by the management controller and in response to the identification, an identifier for the data processing system to a storage system via an out of band communication channel;
    obtaining, by the management controller and via the out of band communication channel, an update configuration for the data processing system based on the identifier provided for the data processing system; and
    providing, by the management controller and via a side band communication channel, the update configuration to an agent hosted by hardware resources of the data processing system to initiate implementation of the update configuration for the data processing system, wherein the data processing system comprises a network module adapted to separately advertise network endpoints for the management controller and the hardware resources, the network endpoints being usable by the storage system to address communications to the hardware resources and the management controller, the management controller hosts a transmission control protocol/internet protocol (TCP/IP) stack to facilitate network communications via the out of band communication channel, and the update configuration specifies a configuration for an application hosted by the hardware resources.

2. The method of claim 1, wherein the management controller and the network module are on separate power domains from the hardware resources so that the management controller and the network module are operable while the hardware resources are inoperable.

3. The method of claim 2, wherein the update event occurs while the hardware resources are inoperable due to being unpowered.

4. The method of claim 3, wherein the update configuration is obtained while the hardware resources are inoperable due to being unpowered.

5. The method of claim 1, wherein the out of band communication channel runs through the network module, and an in band communication channel that services the hardware resources also runs through the network module.

6. The method of claim 1, wherein the update configuration for the data processing system is implemented by modifying a user applied configuration for the application to match the configuration.

7. The method of claim 1, wherein the update event is receipt of a notification from the storage system that an administrator has assigned the update configuration for implementation by the data processing system.

8. A non-transitory machine-readable medium having instructions stored therein, which when executed by a processor, cause the processor to perform operations for managing data processing systems, the operations comprising:
  making, by a management controller of a data processing system of the data processing systems, an identification that an update event for the data processing system has occurred;
  providing, by the management controller and in response to the identification, an identifier for the data processing system to a storage system via an out of band communication channel;
  obtaining, by the management controller and via the out of band communication channel, an update configuration for the data processing system based on the identifier provided for the data processing system; and
  providing, by the management controller and via a side band communication channel, the update configuration to an agent hosted by hardware resources of the data processing system to initiate implementation of the update configuration for the data processing system, wherein the data processing system comprises a network module adapted to separately advertise network endpoints for the management controller and the hardware resources, the network endpoints being usable by the storage system to address communications to the hardware resources and the management controller, the management controller hosts a transmission control protocol/internet protocol (TCP/IP) stack to facilitate network communications via the out of band communication channel, and the update configuration specifies a configuration for an application hosted by the hardware resources.

9. The non-transitory machine-readable medium of claim 8, wherein the management controller and the network module are on separate power domains from the hardware resources so that the management controller and the network module are operable while the hardware resources are inoperable.

10. The non-transitory machine-readable medium of claim 9, wherein the update event occurs while the hardware resources are inoperable due to being unpowered.

11. The non-transitory machine-readable medium of claim 10, wherein the update configuration is obtained while the hardware resources are inoperable due to being unpowered.

12. The non-transitory machine-readable medium of claim 8, wherein the out of band communication channel runs through the network module, and an in band communication channel that services the hardware resources also runs through the network module.

13. The non-transitory machine-readable medium of claim 8, wherein the update event is receipt of a notification from the storage system that an administrator has assigned the update configuration for implementation by the data processing system.

14. A data processing system, comprising:
  a processor; and
  a memory coupled to the processor to store instructions, which when executed by the processor, cause the processor to perform operations for managing data processing systems including the data processing system, the operations comprising:
    making, by a management controller of the data processing system, an identification that an update event for the data processing system has occurred;
    providing, by the management controller and in response to the identification, an identifier for the data processing system to a storage system via an out of band communication channel;
    obtaining, by the management controller and via the out of band communication channel, an update configuration for the data processing system based on the identifier provided for the data processing system; and
    providing, by the management controller and via a side band communication channel, the update configuration to an agent hosted by hardware resources of the data processing system to initiate implementation of the update configuration for the data processing system, wherein the data processing system comprises a network module adapted to separately advertise network endpoints for the management controller and the hardware resources, the network endpoints being usable by the storage system to address communications to the hardware resources and the management controller, the management controller hosts a transmission control protocol/internet protocol (TCP/IP) stack to facilitate network communications via the out of band communication channel, and the update configuration specifies a configuration for an application hosted by the hardware resources.

15. The data processing system of claim 14, wherein the management controller and the network module are on separate power domains from the hardware resources so that the management controller and the network module are operable while the hardware resources are inoperable.

16. The data processing system of claim 15, wherein the update event occurs while the hardware resources are inoperable due to being unpowered.

17. The data processing system of claim 16, wherein the update configuration is obtained while the hardware resources are inoperable due to being unpowered.

18. The data processing system of claim 14, wherein the out of band communication channel runs through the network module, and an in band communication channel that services the hardware resources also runs through the network module.

19. The data processing system of claim 14, wherein the update configuration for the data processing system is implemented by modifying a user applied configuration for the application to match the configuration.

20. The data processing system of claim 14, wherein the update event is receipt of a notification from the storage system that an administrator has assigned the update configuration for implementation by the data processing system.

* * * * *